United States Patent [19]

You et al.

[11] Patent Number: 5,730,876
[45] Date of Patent: Mar. 24, 1998

[54] SEPARATION AND PURIFICATION OF LOW MOLECULAR WEIGHT CHITOSAN USING MULTI-STEP MEMBRANE SEPARATION PROCESS

[75] Inventors: Hyang-Ja You, Dongshin Apt. 6-910, Weolgyae 1-dong, Nowon-ku, Seoul; Kil-Hyun Park, Kyungki-do; Yong-Ho Kim; Yong-Ju Kim, both of Kwangju; Jae-Hyeok Choi; Seon-Jeong Kim, both of Seoul; Soon-Hong Lee, Chungnam, all of Rep. of Korea

[73] Assignee: Hyang-Ja You, Seoul, Rep. of Korea

[21] Appl. No.: 865,670

[22] Filed: May 30, 1997

[51] Int. Cl.$^6$ ............................................. B01D 61/00
[52] U.S. Cl. ...................... 210/651; 210/650; 210/641; 127/34; 127/46.1; 127/55; 536/20
[58] Field of Search ............................ 210/650, 651, 210/652, 653, 654, 655, 773, 641, 656; 127/37, 34, 40, 46.1, 55; 536/20

[56] References Cited

U.S. PATENT DOCUMENTS

| 4,735,193 | 4/1988 | Kulprathipanja | 127/46.3 |
| 4,804,750 | 2/1989 | Nishimura et al. | 536/20 |
| 5,550,189 | 8/1996 | Qin et al. | 525/54.3 |

FOREIGN PATENT DOCUMENTS

1256395 A 10/1989 Japan.

Primary Examiner—Ana Fortuna
Attorney, Agent, or Firm—Abelman, Frayne & Schwab

[57] ABSTRACT

A multi-step membrane separation process whereby the natural polymer α-chitosan extracted from the shell of crustaceans, etc. can be simply separated and purified into low molecular weight chitosan or oligosaccharide chitosan in a high yield. A chitosan mixture of various molecular weights is reacted with an acid in the presence of enzyme while applying an ultrasonic treatment to the mixture and then, added with pure water to give an aqueous solution having a chitosan concentration of 1 to 50%. It is subjected to a continuous membrane filtration under a pressure and further to a second fractionation and separation technique employing a proper membrane according to a desired molecular weight cut-off, at least one time.

5 Claims, No Drawings

SEPARATION AND PURIFICATION OF LOW MOLECULAR WEIGHT CHITOSAN USING MULTI-STEP MEMBRANE SEPARATION PROCESS

BACKGROUND OF THE INVENTION

1. Field of the invention

The present invention relates, in general, to a method for separating low molecular weight chitosan using a multi-step membrane separation process. More particularly, the present invention relates to a multi-step membrane separation process whereby the natural polymer α-chitosan extracted from the shell of crustaceans can be simply separated and purified into low molecular weight chitosan or oligosaccharide chitosan in a high yield.

2. Description of the Prior Art

Chitin, a polysaccharide found in the shell of crustaceans, consists of N-acetylglucosamine in β-1,4 linkage. Thus, chitin has a chemical structure similar to that of cellulose except that the substituent at C-2 of glucopyranose is an acetylated amino group (—NHCOCH$_3$) rather than a hydroxyl group (—OH).

Chitosan is derived when chitin is deacetylated. Having an IUPAC name of $(1 \rightarrow 4)$ 2-amino-2-deoxy-β-D-glucosamine, chitosan is widely distributed in the shell of crustaceans, such as shrimp, crab and etc. Recent research results reveal that chitosan is a very useful natural material, which can be beneficially utilized in many fields including environment, chemistry, agriculture, biology, medicine, and food industry. As disclosed in many scientific reports, oligosaccharides of chitin have been proven to have a variety of values as medicines and foodstuffs and to be effective for prophylaxis of disorders including cancer. In fact, there are ancient archives recording that materials containing chitin are used as medicines for treatment of disorders in Korea, Japan and China.

Because $1 \rightarrow 4$ β-D-glucosamine linkage of chitosan is quiet stable, chemical processes for separating chitosan are very complicated, causing a problem of environmental pollution. Mechanical separation using liquid chromatography and/or ion exchange resin column is disadvantageous in that, when high molecular weight chitosan is fractionated into low molecular weight chitosan or oligosaccharides, yield is very low compared with high cost. Thus, there has been needed a simple physical separation method whereby low molecular weight chitosan or oligosaccharide chitosan can be obtained in a high yield.

Japanese Pat. Laid-Open No. Sho. 54-148890 discloses that some low molecular weight chitosan can be prepared by treating the chitosan deacetylated from natural chitin in a 0.007 to 0.35% hydroperoxide solution adjusted into pH 6 to 12.

Japanese Pat. Laid-Open No. Hei. 1-256395 teaches an enzyme reaction for preparing low molecular weight chitosan. According to this literature, natural chitosan is deacetylated, added continuously with an acid under the control of addition speed, and reacted in the presence of an enzyme while maintaining a constant pH of 3 to 9, to give a D-glucosamine-free low molecular weight chitosan with a molecular weight of 340 to 50,000.

Japanese Pat. Laid-Open No. Hei 2-11601 discloses that when chitosan is reacted with 0.1 to 20 wt % of hydroperoxide, low molecular weight chitosan can be prepared by controlling the pH of the reactant into 5 or lower with hydrochloric acid or acetic acid.

In Japanese Pat. Laid-Open No. Hei. 2-200196, there is disclosed a method for preparing low molecular weight chitosan in which natural chitosan is treated with one or more neutral proteases or lipases capable of digesting it.

Use of weak acid anionic exchange resin column in fractionating chitosan is disclosed in Monthly Food Chemistry, Feb. 1993, Japan, entitled with "Separation and Analysis Techniques of Chitin, Chitosan Oligosaccharides".

In summary, according to such conventional techniques, natural chitosan is decomposed by using an acid, such as hydrochloric acid, phosphoric acid or nitric acid, a hydroperoxide solution, or an enzyme under an acidic condition, fractionated several times into soluble and insoluble phase in methanol (CH$_3$OH), separated into respective oligosaccharides by the concentration change of methanol, and subjected to chromatography or ion exchange resin column technique. Such acid decomposition for obtaining the low molecular weight chitosan or oligosaccharide chitosan, however, needs much time and high cost, leaving after-treatment, toxicity and environment problems. In other words, the conventional techniques are very low in yield in addition to showing disadvantages of environment pollution and time-consuming after-treatment, so that they are difficult to scale up into industrialization.

SUMMARY OF THE INVENTION

As a result of present inventors' intensive and thorough research, a method whereby pure white low molecular weight chitosan for medicine, biology, food, etc. can be separated and purified from the shell of crustaceans, was developed.

Therefore, it is an object of the present invention to overcome the problems encountered in prior arts and to provide a method for separating low molecular weight chitosan, superior in yield, using a simple multi-step membrane separation process.

In accordance with the present invention, the above object could be accomplished by a multi-step membrane separation process of low molecular weight chitosan, comprising the steps of:

reacting a chitosan mixture of various molecular weights with an acid in the presence of enzyme while applying an ultrasonic treatment to the mixture, to give a chitosan solution having an average molecular weight less than 100,000 and a degree of polydispersity of 1.5 to 2.5;

adding pure water to said chitosan solution to give an aqueous solution having a chitosan concentration of 1 to 50%;

subjecting said aqueous solution to a continuous membrane filtration by using a membrane under a pressure of 0.5 to 5 kg/cm$^2$, to fractionate and separate the chitosan; and treating the separated chitosan with a second fractionation and separation technique employing a proper membrane according to the desired molecular weight cut-off, at least one time.

DETAILED DESCRIPTION OF THE INVENTION

The natural chitosan obtained from the shell of shrimp, crab, etc. is first treated with an acid to control its viscosity to a range of 1 to 15 cps and further, treated with various acid in the presence of enzyme for the sake of acid decomposition and water solubilization. Concurrently with the acid and enzyme treatment, ultrasonic waves are applied to the chitosan. It is economically preferred that such ultrasonic treatment is carried out at a frequency of 40 to 60 KHz for 10 to 120 min, more preferably 30 to 60 min. An advantage of the ultrasonic treatment is that the efficiency of the acid and enzyme treatment is maximized, so that acid and enzyme treatment time can be shortened. The acid and enzyme treatment of chitosan is to obtain water-soluble oligomer suitable for the subsequent process, a membrane separation process and preferably continues to be carried out until the resulting chitosan has an average molecular weight less than 100,000 and a degree of polydispersity ranging from 1.5 to 2.5. This reaction is terminated by deactivating the enzyme, which is effected by adding inorganic or organic acid to the above reactant or elevating the temperature.

Then, after being dried in vacuo, the chitosan is dissolved in pure water to give an aqueous solution with a chitosan concentration of 1 to 50% and then controlled to have pH 6 to 8, a condition suitable for the subsequent membrane separation process, which is then primarily fractionated and separated under a pressure of 0.5 to 5 kg/cm$^2$ by a continuous membrane filtration technique. Further separation of chitosan using a membrane having a suitable molecular weight cut-off produces low molecular weight chitosan of a desired molecular weight range in an improved yield. At this time, the driving force for the separation ranges preferably from 0.5 to 5 kg/cm$^2$. Repeating the membrane separation process presents desired low molecular weight chitosan of specific ranges in a high yield. In order to obtain higher purity of low molecular weight chitosan, it may be further purified with alcohol ($C_2H_5OH$), dried and freeze-dried.

Advantageously, the molecular weight cutting-off and separation according to the present invention utilizes a physical multi-step membrane separation process without chemical treatment, to control the molecular weight distribution of chitosan, thereby obtaining chitosan having an average molecular weight less than 10,000 and a degree of polydispersity of 1.5 to 2.5. In addition, the membrane separation process of the present invention can be repeated to produce non-toxic and pure low molecular weight chitosan or oligosaccharides at a large amount per time. Preferably, the chitosan produced after the continuous membrane filtration has an average molecular weight less than 10,000, and the second fractionation and separation can be utilized to produce chitosan of an average molecular weight down to less than 1,000, depending on the molecular weight cut-off of the used membrane.

The acid useful in the present invention includes an inorganic acid, such as sulfuric acid, nitric acid, hydrochloric acid or phosphoric acid, an organic acid, such as citric acid, acetic acid or formic acid, or the mixtures thereof. The concentration of the acid solution used concurrently with the ultrasonic treatment ranges from 0.1 to 1.0N.

As for the enzyme, chitosanase, chitinase, cellulase, lysozyme or the mixtures thereof are exemplified. It is added at an amount of 0.01 to 25 wt % based on the weight of the substrate, chitosan.

Generally covering a range of biose to decose, oligosaccharide consists of monosaccharides in glycosidic linkage. Oligosacchride may be produced by hydrolysis of polysaccharide. The most of hydrolyzed products belong to oligosaccharide, an oligomer, having low molecular weight.

The types and molecular weights of the cut-off oligosaccharides obtained from chitosan by the multi-step membrane separation process of the present invention are given in the following Table 1.

TABLE 1

| Saccharide | Molecular Weight | Solubility (% in water) | $CH_3OH$ Solubility (20° C., g/100 ml) |
|---|---|---|---|
| D-Glucosamine HCl | 215.63 | 37.1 | 0.4 |
| Chitobiose HCl | 413.25 | 190 | 5.4 |
| Chitotriose HCl | 610.87 | 177 | 37 |
| Chitotetrose HCl | 808.49 | 158 | 45 |
| Chitopentose HCl | 1006.1 | 86 | 4.6 |
| Chitohexose HCl | 1203.7 | 68 | 1.7 |

The oligosaccharides of chitosan usually have —C1 group and contain the nitrogen atom of free amino group. It is known that the oligosaccharide chitosan that shows pH 5.7 to 7.4 in an aqueous state is available for foodstuffs. For medicine and food usage, chitosan having a molecular weight lower than 10,000 is generally used.

A better understanding of the present invention may be obtained in light of following examples which are set forth to illustrate, but are not to be construed to limit, the present invention.

EXAMPLE I

The natural chitosan obtained from shrimp and crab was treated with hydrochloric acid, to give a solution with a viscosity of about 1 to 15 cps. The viscosity was measured using a spindle spin viscometer, such as that commercially available from Brookfield Co. U.S.A., identified as "Model DV-II". It was added with a 0.1 to 1N mixed acid consisting of 1:1 of acetic acid and formic acid and with chitosanase at 0.1 to 3% by weight based on the weight of chitosan. At the same time, an ultrasonic treatment is carried out at 40 kHz for about 30 to 60 min, to promote the removal of acid group from chitosan. The treatment conditions and the average molecular weight of obtained chitosan are given in Table 2 below.

TABLE 2

| Code for Chitosan treated | C1 | C2 | C3 | C4 | C5 | C6 | C7 | C8 |
|---|---|---|---|---|---|---|---|---|
| Reac. Time (min) | 30 | 60 | 30 | 60 | 30 | 60 | 30 | 60 |
| Ultrasonification (KHz) | — | — | 40 | 40 | 40 | 40 | 40 | 40 |
| Enz. Conc (wt %) | 3 | 3 | 0.3 | 0.3 | 3 | 3 | 0.1 | 0.1 |
| Acid (N) | 0.5 | 0.5 | 1 | 1 | 0.5 | 0.5 | 0.1 | 0.1 |
| Avg. Mol. wt (×1000) | 200 | 180 | 92–96 | 89–92 | 78–80 | 75–79 | 100–105 | 104–110 |

The resulting solution of chitosan C5 having an average molecular weigh of 78,000 to 80,000 was dried in vacuo. The dried chitosan was dissolved in pure water (conductivity; 0.445) to produce 20% chitosan solution which was controlled to have about pH 7, and then subjected to a continuous membrane filtration pilot process employing a membrane HFK131 (Koch Co., U.S.A.) under a driving force of about 0.5 to 5 kg/cm². The permeate thus obtained had an average molecular weight of about 4,500. Said permeate was passed through a ultrafiltration membrane HFK328 (Koch Co., U.S.A.) under a driving force of about 3 kg/cm², to separate pure white low molecular weight chitosan, which was, then, freeze-dried. The product was free of impurity with a deacetylation degree of 99%, and had an average molecular weight of about 1,000 as measured by gel permeation chromatography (GPC).

Following are GPC measuring condition and measurement technique of deacetylation degree.

GPC measuring condition

1. Apparatus: Waters LC Module equipped with a heating chamber, I, M410-RI, Ultrahydrogel 250, 1000, Linear Column, M2010 Millennium
2. Flow Rate: 1.0 ml/min
3. Column Temp.: 36° C.
4. Mobile Phase: 0.1M acetic acid/0.1M NaCl
5. Sample Amount injected: 150 μl
6. Sample Preparation: 0.2 w/v % solution passed through 0.45 μl filter
7. Control: Pullulan Deacetylation (DA) Degree Measurement Taking advantage of polyvinyl sulfate potassium, the measurement was performed as follows: First, 0.5 g of sample chitosan was dissolved in 100 ml of 0.5% acetic acid. 1 g of the solution was mixed with 30 ml of distilled water and then, with toluidine blue, an indicator. While titration was executed with polyvinyl sulfate potassium, the changing point from blue to violet was read. For reference, DA degree was calculated according to the following formulas:

$$x = 1/400 \times 1/1000 \times F \times 161 \times V$$

$$y = 0.5 \times 1/100 - x$$

$$DA = (x/161) + [(x/161) + (y/203)]$$

EXAMPLE II

The primarily treated chitosan C7 of Example I, having an average molecular weight of 100,000 to 105,000, was separated through a micro-filtration membrane (MFK603, Koch Co., U.S.A.) and subsequently through an ultrafiltration membrane (HFK328, Koch Co., U.S.A.), to give an average molecular weight about 1,000 and a degree of polydispersity of 1.5 to 2.0 as determined by GPC.

EXAMPLE III

The primarily treated chitosan C6 of Example I, having an average molecular weight of 75,000 to 79,000, was separated through an ultrafiltration membrane (UF) HFK328 only and through a micro-filtration membrane (MF) MFK603 and subsequently through an ultrafiltration membrane (UF) HFK328.

The effect of multi-step membrane processes on the separation of low M.W. chitosan was shown in Table 3 below.

TABLE 3

|  | UF | MF-UF |
|---|---|---|
| Yield (%)* | 20 | 80–95 |
| Average M.W. | 1,000 | 1,000 |

*Yield(%) = $\frac{\text{weight of chitosan after filtration}}{\text{weight of unseparation chitosan}} \times 100$

EXAMPLE IV

The procedure of Example I was repeated except that a micro-filtration membrane MFK603 (Koch Co., U.S.A.) under a driving force about 0.5 to 5 kg/cm² was primarily used. Chitosan in the permeate of said membrane treatment had an average molecular weight of about 9,000. The resulting permeate was passed through a ultrafiltration membrane HFK328 (Koch Co., U.S.A.). Chitosan in the permeate after the second membrane filtration had an average molecular weight of about 1,000.

The final products obtained were subjected to quantitative analysis to see how much heavy metals (Pb, As) were contained therein. Using an atomic absorption spectrometer, such as that sold by Varian Co., U.S.A., identified as Model "SpectrAA-300", peaks were read on 217 nm for Pb and 193.7 nm for As. 0.3 ppm or less and 0.1 ppm or less were detected for Pb and As, respectively, both of which were found to be permitted as medicine and foodstuffs.

The anti-oxidizing ability of the final products was compared with that of vitamin C, a representative antioxidant for food and cosmetic. 0.1%, 0.5%, 1.0% and 2.0% solutions of the final products of Examples I and II were prepared. Anti-oxidizing ability was 21.23%, 28.51%, 47.83% and 58.28% for vitamin C while 13.84%, 25.50%, 30.98% and 53.47% for the final product solutions, as immediately determined using a UV-visible spectrometer, such as that sold by Varian Co., U.S.A., identified as Model "Cary I", at a frequency of 520 to 532 nm and at room temperature. Thus, the oligosaccharide chitosan of the present invention was proven to be very stable and be of superior antioxidizing ability.

As described hereinbefore, the multi-step membrane separation process of the present invention, as an alternative method to solve the problems encountered in prior arts, is industrially valuable whereby low molecular weight chitosan can be simply obtained in a high yield.

The present invention has been described in an illustrative manner, and it is to be understood the terminology used is intended to be in the nature of description rather than of limitation.

Many modifications and variations of the present invention are possible in light of the above teachings. Therefore, it is to be understood that within the scope of the appended claims, the invention may be practiced otherwise than as specifically described.

What is claimed is:

1. A multi-step membrane separation process of low molecular weight chitosan, comprising the steps of:

reacting a chitosan mixture of various molecular weights with an acid in the presence of enzyme while applying an ultrasonic treatment to the mixture, to give a chitosan solution having an average molecular weight less than 100,000 and a degree of polydispersity of 1.5 to 2.5;

adding pure water to said chitosan solution to give an aqueous solution having a chitosan concentration of 1 to 50%;

subjecting said aqueous solution to a continuous membrane filtration by using a membrane under a pressure of 0.5 to 5 kg/cm$^2$, to fractionate and separate the chitosan; and treating the separated chitosan with a second fractionation and separation technique employing a proper membrane according to a desired molecular weight cut-off, at least one time.

2. The multi-step membrane separation process in accordance with claim 1, wherein said ultrasonic treatment is carried out at 40 to 60 kHz for 10 to 120 min.

3. The multi-sept membrane separation process in accordance with claim 2, wherein said ultrasonic treatment is carried out at 40 to 60 kHz for 30 to 60 min.

4. The multi-step membrane separation process in accordance with claim 1, wherein the permeated chitosan mixture after said continuous membrane filtration has an average molecular weight less than 10,000.

5. The multi-step membrane separation process in accordance with claim 1, wherein the permeated chitosan mixture after said second fractionation and separation has an average molecular weight down to less than 1,000, depending on the molecular weight cut-off of the used membrane and a degree of polydispersity of 1.5 to 2.5.

* * * * *